(12) United States Patent
Dortu et al.

(10) Patent No.: US 6,791,358 B2
(45) Date of Patent: Sep. 14, 2004

(54) CIRCUIT CONFIGURATION WITH SIGNAL LINES FOR SERIALLY TRANSMITTING A PLURALITY OF BIT GROUPS

(75) Inventors: Jean-Marc Dortu, München (DE); Andreas Jakobs, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/414,836

(22) Filed: Apr. 16, 2003

(65) Prior Publication Data

US 2003/0194019 A1 Oct. 16, 2003

(30) Foreign Application Priority Data

Apr. 16, 2002  (DE) .................................. 102 16 822

(51) Int. Cl.[7] .............................................. H03K 19/0175

(52) U.S. Cl. .................... 326/86; 326/82; 326/90

(58) Field of Search .................... 326/82, 86, 90

(56) References Cited

U.S. PATENT DOCUMENTS 6,069,494 A * 5/2000 Ishikawa ...................... 326/86
6,177,807 B1 * 1/2001 Bertin et al. .................. 326/30

* cited by examiner

Primary Examiner—Anh Q. Tran
(74) Attorney, Agent, or Firm—Laurence A. Greenberg; Werner H. Stemer; Gregory L. Mayback

(57) ABSTRACT

A circuit configuration has a transmitter unit connected to a first signal line and a receiver unit connected to a second signal line and is coupled to the transmission unit via a third signal line and a control line. The transmission unit receives and transmits a first bit group to be transmitted and a subsequent, second bit group to be transmitted. The transmission unit respectively identifies a signal state change between bits in the transmitted first bit group and corresponding bits in the received second bit group and determines the number of signal state changes. On the basis of the number thereof, the transmission unit transmits the second bit group to the receiver unit in unaltered or altered form, with altered transmission being indicated by a control signal. By influencing the number of charge reversal operations during signal transmission, the circuit configuration permits an overall reduction in current drawn.

6 Claims, 1 Drawing Sheet

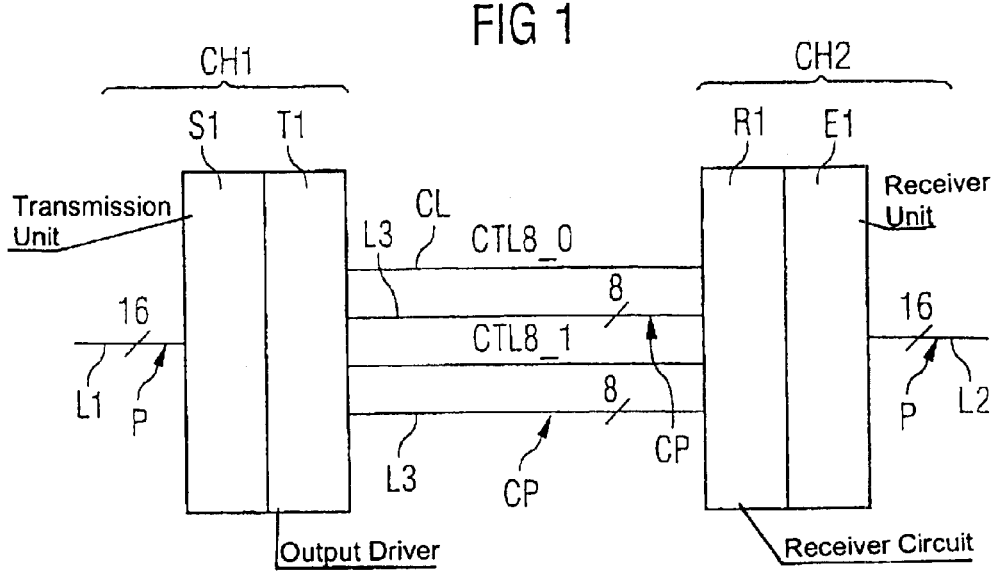
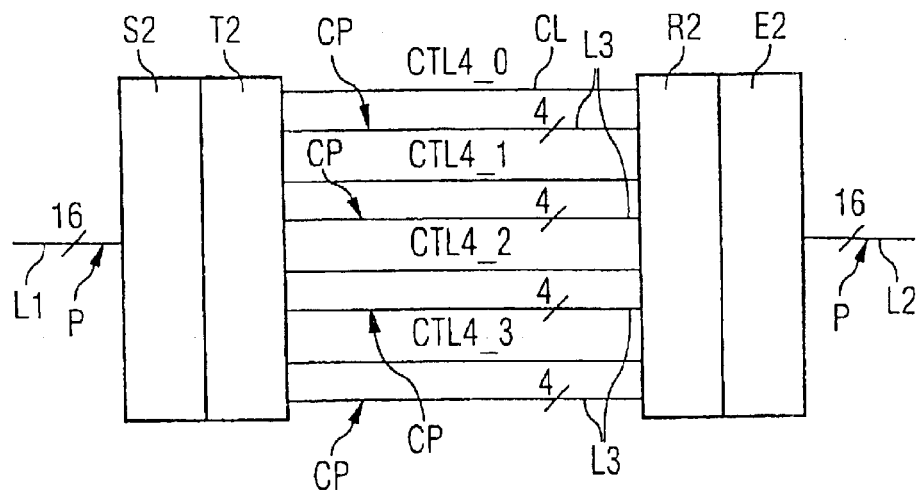
FIG 3
| No. | P | CP | T01 | T00 | CTL8 |
|---|---|---|---|---|---|
| 1 | 10100110 | 10100110 | - | - | 0 |
| 2 | 11101011 | 00010100 | 3 | 1 | 1 |
| 3 | 10011101 | 10011101 | 3 | 3 | 0 |

CIRCUIT CONFIGURATION WITH SIGNAL LINES FOR SERIALLY TRANSMITTING A PLURALITY OF BIT GROUPS

BACKGROUND OF THE INVENTION

Field of the Invention

The present invention relates to a circuit configuration with a first and a second signal line for serially transmitting a number of a plurality of bit groups.

Integrated circuits generally have signal lines which are used for serially transmitting individual bit groups, for example in the form of data words or command words. In general, different logic states 0 and 1 are transmitted, these having different voltage levels. The logic state 0 corresponds to a voltage of 0V, for example, and the logic state 1 corresponds to a voltage of 2.5V, for example. When information is transmitted over electrical lines using different voltage levels, electric current is drawn. The particular reason for this is that the signal lines have electrical capacitances whose charges need to be reversed when there is a change of signal state. Particularly in circuit configurations in which a plurality of integrated circuits, for example on a "motherboard", are connected to one another by a system bus, comparatively high line capacitances are present. In this case, the respective output drivers in the circuits need to reverse the charges of the line capacitances of the system bus during signal transmission.

Assuming that the load on an output driver of the circuit is purely capacitive, that is to say that the current drawn is used primarily for reversing the charges of the line capacitances (leakage currents being ignored), the current drawn can be calculated as:

$$I = k \cdot n \cdot C \cdot V \cdot F.$$

In this context, V denotes the voltage for an output driver, I denotes the current drawn, C denotes the capacitance whose charge is to be reversed, F denotes the system frequency, n denotes the number of output drivers and k denotes a constant which is dependent on the bit patterns which are to be transmitted.

If, by way of example, bit groups containing 8 bits each are transmitted serially, then a maximum current drawn for signal transmission is reached when, upon serial transmission of the bit groups, the respective bits corresponding to one another each change their signal state upon transmission of a respective bit group. One possible series of patterns is, by way of example, 00000000, 11111111, 00000000, etc. In this case, the current drawn is governed primarily by the signal transitions from 0 to 1. Upon transmission of the first two bit groups cited, eight signal state changes from 0 to 1 occur. In the example cited, only two bit patterns are used. To calculate a proportionality factor for calculating a current drawn, the eight signal state changes are divided by two (number of bit patterns), and a proportionality factor of 4 is obtained. By contrast, an average current drawn gives a proportionality factor of 2 if it is assumed that, when a bit with the signal state 0 is transmitted, the likelihood of subsequent transmission of a bit with the signal state 1 is 50%. Accordingly, the average current drawn is halved as compared with the maximum current drawn that is cited above.

SUMMARY OF THE INVENTION

It is accordingly an object of the invention to provide a circuit configuration with signal lines for serially transmitting a plurality of bit groups that overcomes the above-mentioned disadvantages of the prior art devices of this general type, which permits the lowest possible current drawn for signal transmission.

With the foregoing and other objects in view there is provided, in accordance with the invention, a circuit configuration. The circuit configuration contains a first signal line and a second signal line for serially transmitting a number of a plurality of bit groups, a transmission unit connected to the first signal line, a third signal line, a control line, and a receiver unit connected to the second signal line and coupled to the transmission unit through the third signal line and the control line. The transmission unit receives a received first bit group to be transmitted and a subsequent, received second bit group to be transmitted and respectively transmits the received first bit group and the received second bit group to the receiver unit in an unaltered or an altered form resulting in a transmitted first bit group and a transmitted second bit group. The transmission unit respectively identifies a signal state change between bits in the transmitted first bit group and corresponding bits in the received second bit group and determines a number of signal state changes. The transmission unit transmits the received second bit group to the receiver unit in an unaltered or an altered form on a basis of the number of signal state changes, with altered transmission being indicated by a control signal on the control line.

The inventive circuit configuration contains the transmission unit which is connected to the first signal line and also the receiver unit which is connected to the second signal line. The transmission unit and the receiver unit are coupled to one another via the third signal line and the control line. To transmit the serial bit groups, the transmission unit receives a first bit group that is to be transmitted and a subsequent, second bit group that is to be transmitted. It respectively transmits the bit groups to the receiver unit in unaltered or altered form. The transmission unit respectively identifies a signal state change between bits in the transmitted first bit group and corresponding bits in the received second bit group and establishes a number of signal state changes. On the basis of the number of signal state changes, the second bit group is transmitted to the receiver unit by the transmission unit in unaltered or altered form, with altered transmission being indicated by a control signal on the control line. The control signal indicates to the receiver unit if the second bit group is transmitted by the transmission unit in altered form. This allows the receiver unit to decode the altered bit group transmitted by the transmission unit and to return it to its initial state.

The inventive circuit configuration makes it possible to minimize the charge reversal operations during signal transmission between two circuits and hence to minimize the current drawn for signal transmission. By way of example, a first circuit has the transmission unit, and a second circuit has the receiver unit. Both circuits are connected via the third signal line, which is in the form of a system bus, for example. Signal transmission between the transmission unit and the receiver unit is controlled on the basis of the number of signal state changes between mutually corresponding bits in the respective bit groups. Since, as described in the introduction, the type and number of signal state changes affect the current drawn during signal transmission, the current drawn during signal transmission can be minimized in this way.

In one embodiment of the invention, the transmission unit establishes the number of signal state changes from 0 to 1 between the bits in the transmitted first bit group and the corresponding bits in the received second bit group. Advantageously, the second bit group is transmitted to the receiver unit by the transmission unit in altered form if the number of signal state changes from 0 to 1 is greater than the number of common corresponding bits in the transmitted first and the received second bit group with the state 0. In particular, the bits in the second bit group that are received by the transmission unit are in this case transmitted to the receiver unit in inverted form for the purpose of altered transmission. This allows the signal state changes from 0 to 1 which govern the current drawn to be reduced and hence allows the current drawn for transmission via the third signal line to be reduced.

In accordance with an added feature of the invention, the transmission unit transmits the second bit group to the receiver unit in unaltered form if the number of signal state changes from 0 to 1 is less than or equal to the number of common corresponding bits in the transmitted first bit group and the received second bit group with the state 0.

In accordance with a further feature of the invention, a first chip is provided. The transmission unit is disposed on the first chip. In addition, a second chip is provided, and the receiver unit is disposed on the second chip, the third signal line connecting the first chip to the second chip.

Other features which are considered as characteristic for the invention are set forth in the appended claims.

Although the invention is illustrated and described herein as embodied in a circuit configuration with signal lines for serially transmitting a plurality of bit groups, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a first embodiment of a circuit configuration according to the invention;

FIG. 2 is a block circuit diagram of a second embodiment of a circuit configuration according to the invention; and FIG. 3 is a table illustrating the transmission of a plurality of bit groups using an inventive circuit configuration.

DESCRIPTION OF THE PREFERRED EMBODIMENTS

Referring now to the figures of the drawing in detail and first, particularly, to FIG. 1 thereof, there is shown an embodiment of an inventive circuit configuration representing, by way of example, a transmission link between a memory chip CH1 and a processor chip CH2. On the memory chip CH1, a transmission unit S1 is connected to a signal line L1. The signal line L1 is used for transmitting bit groups P having a bit length of 16. The transmission unit S1 is connected to an output driver T1. The processor chip CH2 holds a receiver unit E1 that is connected to a signal line L2. The signal line L2 is used for transmitting received bit groups P having the bit length of 16. The receiver unit E1 has a receiver circuit R1 connected to it. The transmission unit S1 or the driver circuit T1 is coupled to the receiver circuit R1 or the receiver unit E1 via a signal line L3 and a control line CL. The receiver circuit R1 is used for receiving bit groups CP transmitted via the signal line L3. Each of the individual lines of the signal lines L1 to L3 can assume the logic states 0 and 1, represented by voltage levels of 0V and 2.5V, for example. The two individual lines of the control line CL are used for transmitting control signals CTL8_0 and CTL8_1. In this case, one control signal is therefore transmitted per byte.

FIG. 2 shows another embodiment of the inventive circuit configuration that is of a similar configuration to the circuit configuration shown in FIG. 1. In contrast to the embodiment shown in FIG. 1, in which the signal line L3 is split into two groups containing eight individual lines each for the purpose of transmitting respective bit groups having the bit length of 8, the signal line L3 shown in FIG. 2 is split into four groups containing four individual lines each which are used for respectively transmitting bit groups having the bit length of 4. Accordingly, FIG. 2 has four individual lines for the control line CL for the purpose of transmitting respective control signals CTL4_0 to CTL4_3. According to FIG. 2, the signal line L3 couples the transmission unit S2 or the driver circuit T2 and the receiver unit E2 or the receiver circuit R2 to one another.

The text below takes the table shown in FIG. 3 as a basis for providing a more detailed explanation of exemplary transmission of a plurality of bit groups using the inventive circuit configuration shown in FIG. 1.

The transmission unit S1 first receives a first bit group P1 that is to be transmitted, FIG. 3 showing only eight of the sixteen bits. On the basis of the table shown in FIG. 3, the transmission unit S1 first receives a pattern P1 with the bit series 10100110. In addition, the transmission unit S1 receives a subsequent, second bit group P2 that is to be transmitted, represented by the pattern 11101011 in FIG. 3. The transmission unit then respectively identifies a signal state change between the bits in the transmitted first bit group CP1 and the corresponding bits in the received second bit group P2 and establishes the number of signal state changes. In particular, the transmission unit S1 establishes the number of signal state changes from 0 to 1, shown by T01 in FIG. 3, and the number of common corresponding bits in the bit groups CP1 and P2 with the state 0, shown by T00 in FIG. 3. In the example shown in FIG. 3, T01=3 signal state changes from 0 to 1 occur between CP1 and P2. The number of common corresponding bits in the bit groups CP1, P2 with the state 0 is equivalent to T00=1. The number of signal state changes from 0 to 1 between CP1 and P2 is thus greater than the number of common corresponding bits in the bit groups CP1, P2 with the state 0, that is to say T01 is greater than T00. T01 governs the current drawn when no inversion takes place. T00 governs the current drawn when inversion subsequently takes place.

In this case, the transmission unit S1 transmits the second bit group P2 to the receiver unit E1 in altered form; in particular, the bits in the second bit group P2 which are received by the transmission unit S1 are transmitted to the receiver unit E1 in inverted form. Hence, a coded second bit group CP2=00010100 is transmitted on the signal line L3. Transmission of the coded second bit group CP2 is indicated by an active control signal CTL8_0 or CTL8_1 on the control line CL. From this, the receiver unit E1 can determine whether the information transmitted via the line L3 is a true data item or whether the received bits need to be inverted as appropriate in order to forward them to the signal line L2. The first bit group P1 is transmitted in unaltered form, that is to say CP1=P1. The altered transmission of the second bit group P2 allows the current drawn which is required for signal transmission to be reduced, since the number of signal state changes from 0 to 1 which govern the current drawn is reduced as compared with unaltered signal transmission.

In the rest of the procedure, the transmission unit S1 receives a third bit group P3, where P3=10011101. The number of signal state changes from 0 to 1 between bits in the bit group CP2 and corresponding bits in the bit group P3 is equivalent to T01=3. The number of common corresponding bits in the bit groups CP2, P3 with the state 0 is equivalent to T00=3. In this example, the previous bit group P2 has been transmitted in altered form on the third signal line L3. In this case, the bit group P3 is nevertheless transmitted to the receiver unit E1 in unaltered form.

The embodiment of the circuit configuration shown in FIG. 2 with four control signals CTL4_0 to CTL4_3 has the advantage, as compared with the embodiment shown in FIG. 1 with two control signals CTL8_0 and CTL8_1, of higher resolution, but the increased number of control signals entails additional current drawn.

We claim:

1. A circuit configuration, comprising:
   a first signal line and a second signal line for serially transmitting a number of a plurality of bit groups;
   a transmission unit connected to said first signal line;
   a third signal line;
   a control line; and
   a receiver unit connected to said second signal line and coupled to said transmission unit through said third signal line and said control line;
   said transmission unit receiving a received first bit group to be transmitted and a subsequent, received second bit group to be transmitted and respectively transmits the received first bit group and the received second bit group to said receiver unit in one of an unaltered and an altered form resulting in a transmitted first bit group and a transmitted second bit group;
   said transmission unit respectively identifying a signal state change between bits in the transmitted first bit group and corresponding bits in the received second bit group and determines a number of signal state changes;
   said transmission unit transmitting the received second bit group to said receiver unit in one of an unaltered and an altered form on a basis of the number of signal state changes, with altered transmission being indicated by a control signal on said control line.

2. The circuit configuration according to claim 1, wherein the bits in the received second bit group received by said transmission unit are transmitted to said receiver unit in inverted form during an altered transmission.

3. The circuit configuration according to claim 1, wherein said transmission unit determines the number of signal state changes from 0 to 1 between the bits in the transmitted first bit group and the corresponding bits in the received second bit group.

4. The circuit configuration according to claim 3, wherein said transmission unit transmits the received second bit group to said receiver unit in altered form if the number of signal state changes from 0 to 1 is greater than a number of common corresponding bits in the transmitted first bit group and the received second bit group with state 0.

5. The circuit configuration according to claim 4, wherein said transmission unit transmits the second bit group to said receiver unit in unaltered form if the number of signal state changes from 0 to 1 is less than or equal to the number of common corresponding bits in the transmitted first bit group and the received second bit group with the state 0.

6. The circuit configuration according to claim 1, further comprising:
   a first chip, and said transmission unit is disposed on said first chip; and
   a second chip, and said receiver unit is disposed on said second chip, said third signal line connecting said first chip to said second chip.

* * * * *